Figure 1:
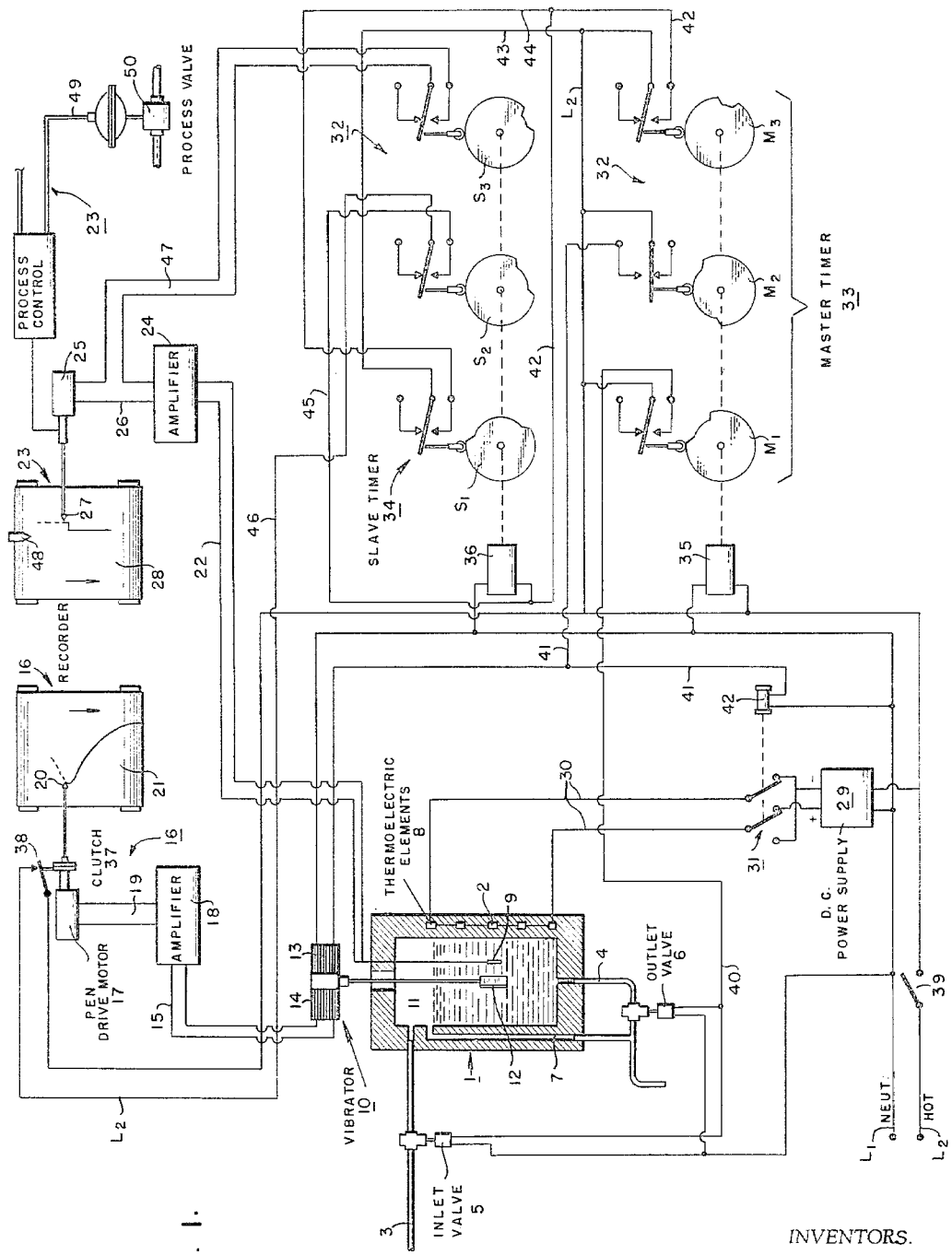

United States Patent Office 3,202,602
Patented Aug. 24, 1965

3,202,602
AUTOMATIC OPERATION AND PROCESS
CONTROL
John B. Beaugh, Lee M. Johnson, and Leland W. Pohler,
Baytown, Tex., assignors, by mesne assignments, to Esso
Research and Engineering Company, Elizabeth, N.J., a
corporation of Delaware
Filed Dec. 26, 1961, Ser. No. 161,847
6 Claims. (Cl. 208—33)

The present invention is directed to a method and apparatus for measuring the pour point of oil and utilizing the measured pour point for automatically controlling the processing of the oil. More particularly, the invention is concerned with the measuring of pour point with a vibrating probe immersed in a sample of the oil wherein the pour point temperature of the oil is measured and the operating conditions for processing the oil are automatically controlled by comparing the measured pour point with a desired poor point temperature for the oil. In its most specific aspect, the invention is directed to the method and apparatus in which an automatically controlled process is provided by sampling oil being processed, measuring the pour point of the oil with a vibrating probe immersed in the oil and comparing the measured pour point with a desired pour point for the oil to change the operating conditions in response to the comparison.

The present method and apparatus for obtaining pour points is a cumbersome and time-consuming operation. The standardized test is set forth in the ASTM standards of 1958 as designation D97–57. This standardized test requires laboratory techniques for measuring pour points as well as a person trained in carrying out the test since a visual observation is required in measuring the pour point temperature. The standardized test presently used requires a person skilled in the technique from about 30 to 180 minutes. Since the procedure requires standardized equipment as well as controlled laboratory techniques, the pour point temperatures must be determined in a laboratory. Accordingly, if present techniques for obtaining pour point temperatures of an operating process are used, it may require from 2 to 8 hours before the results are known for making changes in the operating conditions.

The present invention briefly involves the use of a vibrating probe immersed in an oil sample for measuring its pour point. It has been found that when the oil is cooled from a temperature above its pour point to a temperature below the pour point, surprisingly the damping action of the oil causes a definite change in the vibrational energy of the vibrating probe at the pour point temperature of the oil. The present invention deals with utilizing this rapid means for measuring the pour point of oil to automatically control the operating conditions in an operation processing the oil whereby the operating conditions may be changed in response to a comparison of the measured pour point temperature of the oil with a desired pour point temperature. Utilizing the technique of the present invention, it has been found that a pour point temperature determination may be made in about 10 to about 60 minutes. The determination of pour point may be a part of the operating unit, and accordingly, a much more closely controlled process may be obtained.

The present invention has special application to the processing of lubricating oils since a general requirement of lubricating oils is a specification pour point temperature. The lubricating oils may be those distilled from crude petroleum or may be synthetically produced lubricating oils such as those produced by polymerization, or by conversion operations such as catalytic cracking and the like.

The specification pour point temperature is a requirement for lubricating oils in that it determines quality, end use, type of processing required, and other factors. The pour point temperature of lubricating oils is used as a process control in many oil processes. For example, the pour point may be used to control a lubricating oil distillation in a pipe still to determine the cut points and also as a process control after a hydrofining operation. The use of pour points for lubricating oils has special application in a dewaxing operation since the pour point temperature may be used to determine the efficiency of a dewaxing operation and will generally determine the necessary operating conditions. Pour point temperatures are also obtained in blending operations of lubricating oils to meet specification pour point temperatures required. Accordingly, the present invention may be utilized in any of these foregoing lubricating oil processes or any other oil process wherein the pour point temperature is a critical factor in the operating conditions of the process or in the handling or storage of lubricating oil and the like.

According to the present invention, an oil sample is taken, preferably from the outlet stream of the process or operation and the pour point measured by means of a vibrating probe immersed in the oil while the oil is cooled from a temperature above its pour point to a temperature below its pour point. The change in the vibration of the probe caused by the damping action of the oil is recorded as the properties of the oil change due to cooling. It has been found that at the pour point of the oil, a definite reduction in the damping action of the oil results, and the pour point temperature is obtained by measuring the temperature of the oil sample coincident with this definite break. The vibration of the probe is such as to cause the oil to be pushed away from the probe. Since the pour point temperature is a measure of the temperature wherein there is a lack of flow of the oil, the resulting definite reduction in the damping action of the oil at the pour point may be a result of the lack of flow of oil after being pushed away from the probe, and hence, a more accurate and reproducible pour point may be obtained than by the standardized test now used.

Figure 2:
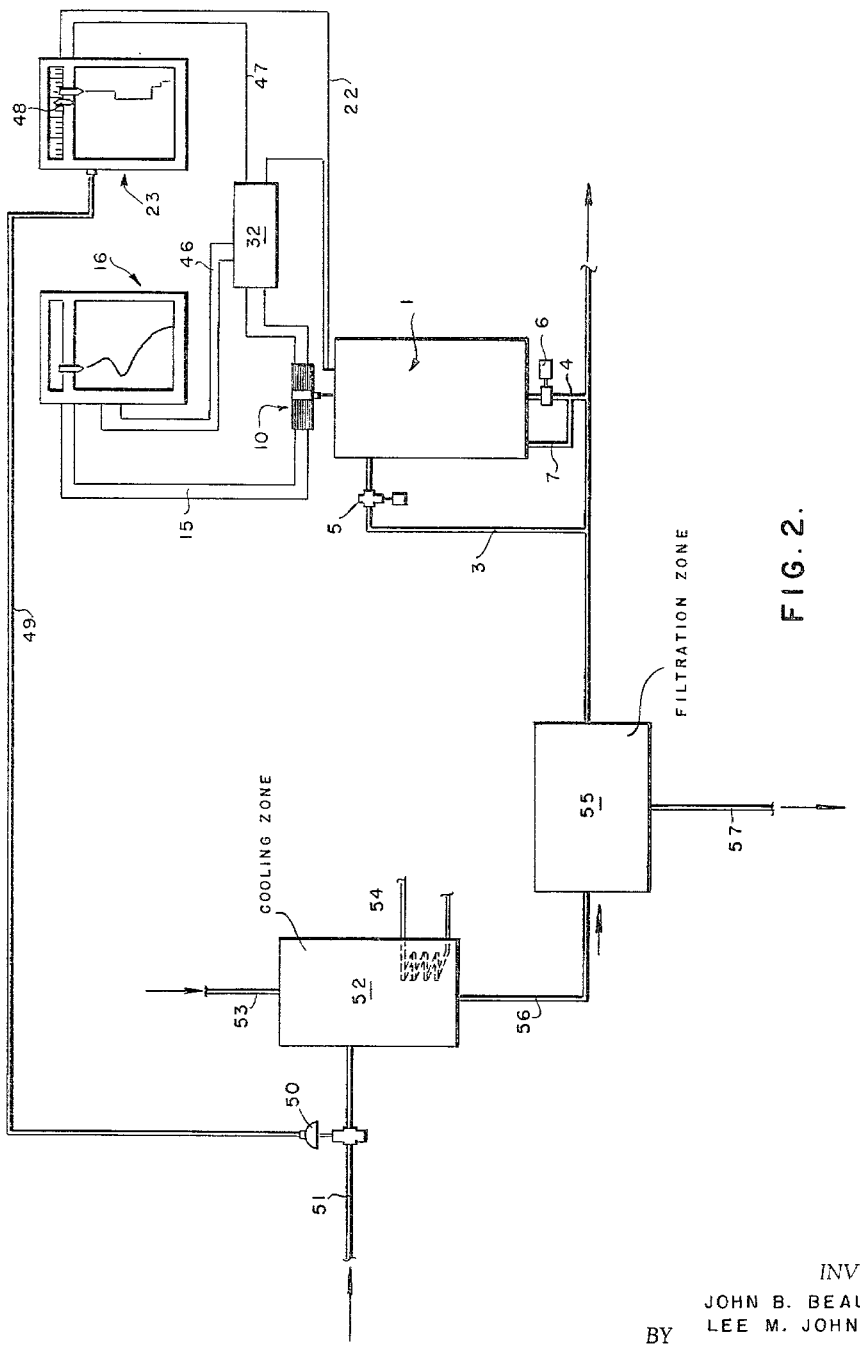

The present invention will be further illustrated by reference to the drawings in which:

FIG. 1 is a schematic diagram of a preferred embodiment for automatically measuring the pour point and actuating a control means to automatically control an oil process; and FIG. 2 is a schematic diagram of a process utilizing the automatic control of the present invention.

Referring to FIG. 1, the diagram discloses a preferred embodiment wherein a sample of oil from an oil process is obtained by sampling means 1. The sampling means comprises a container 2 having an inlet pipe 3 and an outlet pipe 4 for obtaining a sample from a process stream. The inlet and outlet pipes are controlled by solenoid valves 5 and 6, respectively. A uniform sample is obtained by means of overflow pipe 7 wherein the excess oil in container 2 may flow through pipe 7 to the outlet pipe 4. Thermoelectric elements 8 are provided in the wall of container means 2 for changing the temperature of the oil sample. These thermoelectric elements 8 are made by sandwiching a semi-conductor material between two metal plates. When a voltage is applied in one direction, one side of the element is cold and the other hot due to the Peltier effect. The effect is reversed when the voltage is reversed so that the elements may be utilized as both a heating and cooling means. The thermoelectric elements 8 are a commercially available article of manufacture, for example, the "thermoelectric coolers" manufactured by Westinghouse Electric Corporation model type WX–814 or 816. Such a device is described in their publication "Temporary Technical Data 54–966," of October 1959. The thermoelectric elements 8 cool the oil sample while determining the pour point and thereafter heat the oil sample after a pour point determination has been made and prior to a new sample being introduced into container means 2. In the container means 2 is a thermocouple 9 in a fixed position for obtaining a thermosignal for measuring the temperature of the oil sample.

The pour point temperature, according to the present invention, is obtained by using a vibrating means 10 which comprises a probe 11 having a paddle 12 at the end thereof which is located in container means 2 adjacent the thermocouple 9. The vibrating means 10 is preferably a "Dynatrol" which is commercially available from Automation Products Inc. and which is disclosed in their bulletin No. J57 entitled "Dynatrol Level Control-Type CL–10." Essentially the vibrating means 10 consists of a driver end 13 for vibrating the probe 11 and paddle and a pickup end 14 which measures the change in vibration of the probe. The vibrating means 10 and thermocouple 9 are supported by supporting means (not disclosed) for maintaining the thermocouple and vibrating means immersed in the oil sample. The "Dynatrol" comprises a coil in the driver end 13 positioned to vibrate the probe 11 which is connected through a vibration linkage path to the pickup end 14. The vibration linkage path includes the probe 11 and paddle 12 which are immersed in the oil. The linkage path is constructed so as to provide sensitive transmission of vibrational energy through a rigid, all welded pressure seal. This feature is obtained by welding at the node points where zero amplitude of vibration occurs. The pickup end 14 comprises a permanent magnet stator and a coil which generates a voltage as vibration of the pickup armature occurs. If no oil sample were in container means 2, the driver armature amplitude of vibration transmitted through the linkage path to the pickup armature would produce an E.M.F. of approximately 500 millivolts in the pickup end output coil. A damping action, which is proportional to the properties of the oil, occurs when the probe 11 and paddle 12 are immersed in an oil sample to be sensed. This damping action causes a proportional decrease of pickup end armature vibration and coil output. At the pour point of the oil a reduction in the damping action takes place which may be due to the lack of flow of the oil after the oil has been pushed away by the probe and paddle.

The electrical signal produced by the output coil in the pickup end 14 can be fed to a variety of electronic controlling, indicating or recording devices. As disclosed in FIG. 1, the electrical signal is transmitted through electrical lead 15 to a recorder 16. The recorder 16 comprises a pen drive motor 17 and an amplifier 18. The electrical signal produced in the pickup end 14 of the vibrating means 10 is transmitted through electrical lead 15 and amplified in the recorder by amplifier 18. The amplified signal is transmitted through lead 19 to the pen drive motor 17 to actuate the pen 20 whereby the change in vibration of the vibrating probe is recorded on the graph 21. The thermosignal from thermocouple 9 is similarly transmitted through lead 22 to a recorder-controller 23, which, for example, may be a Leeds & Northrup Speedomax H model 5 recorder-controller. The recorder-controller 23 comprises an amplifier 24, a pen drive motor 25 and one lead 26 connecting the amplifier 24 to the pen drive motor 25. The pen drive motor 25 drives pen 27 wherein the thermosignal is recorded on graph 28.

While the preferred means for vibrating the probe and sensing the change in vibration of the probe are electrical coils as used in the "Dynatrol," other means to vibrate a probe and sense the change in vibration may be used. For example, an eccentric cam on the shaft of a synchronous motor may be used to vibrate a probe comprising, for example, a reed or paddle to which is attached a rod connected to a condenser microphone detector. The change in vibration would produce a change in the electrical output of the condenser microphone which would be amplified and recorded.

The thermoelectric elements 8 are connected to a D.C. power supply 29 by leads 30. A double pole, double throw switch 31 is provided wherein the leads 30 when coupled to the D.C. power supply in one position will result in the oil sample in container means 2 being cooled, and when the leads are in the opposite position the sample will be heated.

As is schematically shown in the drawing, the preferred mode utilizes an electrical timer circuit means generally indicated as 32 to automatically determine the pour point temperature of the sample oil in the sampling means 1. The electrical timer circuit means 32 comprises a master timer 33 and a slave timer 34. The master timer 33 consists of a timer motor 35 for rotating switches M1, M2 and M3. Similarly, the slave timer 34 consists of a timer motor 36 for rotating switches S1, S2 and S3.

The definite break in the output signal obtained from the vibrating means 10 is determined by utilizing a friction clutch 37 on the shaft of the pen drive motor 17. The friction clutch 37 is a very sensitive clutch which will actuate a reverse switch 38 when the pen 20 reverses direction at the definite break in the electrical signal obtained from the vibrating means 10. The reverse switch 38 together with the timer circuit 32 provides an actuating means for measuring the pour point of the oil sample to be sensed.

Referring to FIG. 1, the sequence of operation of the invention is as follows: power is supplied by means of a neutral line L1 and a hot line L2. A switch 39 in line L2 actuates the electrical circuit which in turn operates motor 35 of the master timer 33. Switches M1, M2 and M3 commence to rotate. As shown in FIG. 1, all of the master timer switches are in the off position. As the rotating switches rotate, switch M1 is the first to be actuated which is connected to the inlet and outlet solenoid valves 5 and 6, respectively, by lead 40. Upon the opening of switch M1, the solenoid valves 5 and 6 are opened wherein a sample of the oil is obtained from the process stream by pipe 3 which flushes out the container means 2 by forcing the oil out the outlet pipe 4. Upon further rotation of switch M1, the switch is closed which actuates the solenoid valves to a closed position. Any excess oil in the container means 2 flows through the overflow pipe 7 into the outlet pipe 4. Upon further rotation of the master timer, switch M2 becomes closed. Switch M2 is connected to the vibrating means 10 by lead 41. Accordingly, after a sample of oil is obtained, the vibrating means is placed in operation wherein an electrical signal is obtained from the vibrating probe and recorded on the recorder 16. Also, in closing switch M2, a relay 42 for the double pole, double throw switch 31 is actuated by lead 41. The relay 42 being actuated throws the switch 31 to a position such that the thermoelectric elements 8 will cool the sample in the container means 2. The cooling of the oil sample changes the electrical signal generated in response to the vibrational energy of the vibrating probe 11 immersed in the oil as the properties of the oil change due to cooling. Upon continued rotation of the master timer 33, switch M3 is closed which actuates the slave timer 34 by turning on the slave timer motor 36. Switch M3 is connected to the slave timer motor 36 by lead 42. The switch M3 is closed for a length of time sufficient so that the slave timer motor is actuated to rotate the slave timer switches so that switch S1 is closed. After switch S1 is closed, the slave timer motor 36 continues to operate even after M3 is open since switch S1 is connected to line L2 by lead 43 and to the motor by leads 44 and 42. The switches of the slave timer 34 continue rotating when switch S2 becomes closed. Switch S2 is connected to the slave timer motor 36 by lead 45. The other lead 46 of switch S2 is connected to the reverse switch 38. After the closing of switch S2 and in effect making a connection between the slave timer motor 36 and reverse switch 38, switch S1 is open which breaks the circuit to the slave motor 36 stopping the rotation of the slave timer switches. The slave timer 34 has a total time for a single rotation of about 10 seconds to about 2 minutes. Accordingly, the system is readied for determining the pour point temperature anywhere from about several seconds to a minute after the vibrating means 10 has been actuated. The pour point temperature is measured by the continual recording of the electrical signal from the vibrating means 10. The graph 21 shown on the recorder 16 in FIG. 1 is a typical recording wherein the pour point is indicated by the definite break in the output signal obtained from the vibrating means 10. At the definite break, the pen 20 changes direction brought about by the pen drive motor 17 changing direction of rotation. The change of rotation of the pen drive motor shaft engages the friction clutch 37 which in turn closes the reverse switch 38. The reverse switch being connected by leads 46 and 45 to the slave timer motor 36 and also connected to the hot lead L2 commences rotation of the slave timer switches. Switch S3 is provided to open just after and upon further rotation of the switches after the closing of switch S1. Accordingly, upon the further rotation of the switches, switch S3 is closed. The closing of switch S3 completes the circuit from the thermocouple 9 by leads 47 wherein the thermosignal is transmitted to the temperature pen drive motor 25 for measuring and recording the temperature of the oil sample coincident with the definite break in the output signal obtained from the vibrating means 10. The temperature recorded is the pour point temperature of the oil being sampled.

The recorder-controller 23 further comprises a set means 48 wherein a desired pour point temperature may be fed to the recorder-controller 23. The control portion of the recorder-controller 23 is essentially a comparing circuit means and a pneumatic regulator means. When the thermosignal is transmitted to the recorder-controller 23 and recorded on graph 28, the temperature recorded is compared with the desired temperature selected by set means 48. The comparing circuit upon making the comparison actuates the pneumatic regulator. The pneumatic regulator has an air line 49 connected thereto which actuates a control means 50, such as a pressure valve, in a process stream and which is regulated in response to the comparison made by the comparing circuit.

Referring now to FIG. 2, the system for automatically controlling a process is illustrated as applied to a dewaxing operation. The same reference numerals, where applicable, are used for ease of illustration. In a dewaxing operation as in the other oil processes wherein the pour point temperature is critical, the pour point temperature is usually determined in the outlet stream in the process and the temperature pressure and other conditions are changed according to the determined pour point. The dewaxing operation consists of an inlet stream 51 for introducing a lubricating oil to a cooling zone 52. In the inlet stream 51 is a pressure operated valve 50 for controlling the flow of oil to the cooling zone 52. To the cooling zone 52 is added a solvent by means of line 53. The cooling zone 52 is cooled by suitable means 54 and the introduced oil is cooled as it is mixed with the solvent. The oil is then passed to a filtration zone 55 by pipe 56 wherein the wax is removed by line 57 and the dewaxed oil is removed from the outlet stream 58. The sampling means of the present invention is conected to the outlet stream 58 by the inlet pipe 3 and the outlet pipe 4. Sequentially, samples are taken from the outlet stream 58 due to the actuation of the solenoid valves 5 and 6 in lines 3 and 4, respectively. The pour point temperature of the sample is determined and recorded by the recorder-controller 23. The determined pour point temperature is compared with the desired pour point temperature of the oil in the outlet stream. A determined pour point temperature below the desired pour point temperature indicates that more wax is being removed than is necessary; and accordingly, valve 50 would be opened a certain degree to increase the charge of lubricating oil to the dewaxing operation. On the other hand, if the determined pour point temperature is above the desired pour point temperature, more wax is required to be removed and accordingly valve 50 will be actuated to close a certain degree. While valve 50 is illustrated as being in the inlet stream 51, the solvent flow or the temperature could also be controlled by placing the valve 50 in line 53 or 54, respectively.

*Example*

A waxy motor oil fraction with a pour point temperature of 120° F. is introduced by line 51 to the dewaxing operation. A sample is taken from line 58 and the pour point temperature is determined to be 10° F. The desired pour point temperature is 5° F. and accordingly, valve 50 is automatically adjusted to reduce the charge to the dewaxing unit. Likewise, the dewaxing operation may be controlled by regulating the amount of solvent and the temperature at which dewaxing is conducted.

To automatically control an oil process, such as the dewaxing operation already disclosed, results in more than a mere saving of time or a mere matter of convenience. In the prior art operation of a dewaxing process, it is necessary to overcompensate the operating conditions such that the pour point temperature of the outlet stream is less than that desired since to run the operation to obtain the exact pour point of the oil runs the risk that insufficient wax will be removed. Utilizing standardized ASTM pour point methods, it would require at least two hours before it would become apparent that the operating conditions were not proper to obtain the desired pour point. Accordingly, due to the overcompensation of the operating conditions and also of the time factor in obtaining a pour point temperature of the oil in the output stream using present methods, a process is run inefficiently as well as at a greater cost. The present invention wherein a system for automatically controlling a process such as the dewaxing operation provides a method and apparatus for controlling the operating conditions in an efficient and economical manner.

While the sampling device is disclosed on the outlet stream 58, it is appreciated that it may be used on the inlet stream, and that while the charge is disclosed as the condition being controlled, other operating conditions may be controlled by the automatic determination of the pour point.

The nature and object of the present invention having been completely described and illustrated and the best mode thereof set forth, what we wish to claim as new and useful and secure by Letters Patent is:

1. In a continuous oil process wherein a selected pour point temperature of said oil determines the operating conditions of said process, a method for automatically controlling said process comprising sequentially sampling a portion of said oil, vibrating a probe in said oil while cooling said oil sample, recording an electrical signal generated in response to the vibrational energy of said probe, measuring the temperature of said oil sample coincident with a definite break in said recorded electrical signal caused by a reduction in the damping action of said oil on said probe wherein the pour point temperature of said oil is determined, comparing said determined pour point temperature with said desired pour point temperature, and changing an operating condition of said process in accordance with said comparison to achieve said desired pour point temperature in the operation of said process.

2. A method in accordance with claim 1 in which the process is solvent dewaxing of said oil.

3. A method in accordance with claim 2 in which the operating condition is the flow rate of the charge oil.

4. A system for automatically controlling an oil process wherein the operating conditions are changed by control means in said process in relation to a desired pour point temperature for said oil comprising
sampling means for obtaining an oil sample,
means for changing the temperature of said oil sample,
a probe adapted to be immersed in said oil sample,
means for vibrating said probe in said oil sample and generating an electrical signal in response to the vibrational energy of said probe,
thermocouple means adapted to be immersed in said oil sample to provide a thermosignal,
recorder means for recording said electrical signal,
actuating means comprising an electrical circuit and a reverse switch on said recorder for recording said electrical signal to measure by the thermosignal the temperature of said oil sample in response to a definite break in said recorded electrical signal caused by the reduction in the damping action of said oil whereby the pour point temperature of said oil is obtained, and
recorder-controller means for recording said pour point temperature and making a comparison of said measured pour point temperature with said desired pour point temperature and changing said control means in said process in response to said comparison.

5. A system according to claim 4 wherein said recorder-controller means comprises a comparing circuit means for comparing said determined pour point temperature of said oil sample and said desired pour point temperature and a pneumatic regulator means for changing said control means in said process in response to said comparison.

6. A system for automatically controlling a continuous lubricating oil process wherein the operating conditions are changed by control means in said process in relation to a desired pour point temperature for said oil comprising sampling means for sequentially obtaining an oil sample from a stream of said process, means for cooling said oil sample from a temperature above its pour point to a temperature below its pour point, a probe adapted to be immersed in said oil sample, vibrating means for vibrating said probe in said oil and generating an electrical signal in response to the vibrational energy of said probe, thermocouple means adapted to be immersed in said oil sample adjacent said probe to provide a thermosignal, recorder means having a pen drive motor which drives a pen for recording said electrical signal by means of a shaft, timer circuit means for actuating said sampling means, said means for cooling and said vibrating means in a selected timed relationship, a recorder-controller means for recording said thermosignal and changing said control means in said process in response to a comparison made between said recorded thermosignal and a desired pour point temperature, and a reversing switch actuated by a friction clutch on said shaft of said pen drive motor for recording said thermosignal coincident with a definite break in said recorded electrical signal caused by a reduction in the damping action of said oil at its pour point temperature.

References Cited by the Examiner
UNITED STATES PATENTS

| | | | |
|---|---|---|---|
| 1,471,342 | 10/23 | Logan | 196—132.1 |
| 1,888,431 | 11/32 | Osbourne | 137—4 |
| 2,003,667 | 6/35 | Pevere | 208—33 |
| 2,008,570 | 7/35 | Tears | 208—33 |
| 2,340,507 | 2/44 | Bjork | 73—59 |
| 2,386,831 | 10/45 | Wright | 196—132 |
| 2,459,404 | 1/49 | Anderson | 196—132 |
| 3,025,232 | 3/62 | Jones | 137—4 |
| 3,090,223 | 5/63 | Juffa et al. | 73—59 |

ALPHONSO D. SULLIVAN, *Primary Examiner.*